United States Patent [19]

Born

[11] E Re. 30,237

[45] Reissued Mar. 25, 1980

[54] WING TYPE AGITATOR

[75] Inventor: Billy L. Born, Rockford, Ill.

[73] Assignee: Stoelting Brothers Company, Kiel, Wis.

[21] Appl. No.: 914,990

[22] Filed: Jun. 12, 1978

Related U.S. Patent Documents

Reissue of:

[64] Patent No.: 3,856,273
Issued: Dec. 24, 1974
Appl. No.: 372,963
Filed: Jun. 25, 1973

[51] Int. Cl.[2] ..... B01F 13/00

[52] U.S. Cl. ..... 366/261; 366/276

[58] Field of Search ..... 366/261, 277, 74, 332, 366/241, 255, 332; 99/452, 460, 461, 466

[56] References Cited

U.S. PATENT DOCUMENTS

| | | | |
|---|---|---|---|
| 267,211 | 11/1882 | Jenks | 366/261 |
| 654,496 | 7/1900 | Storey | 366/277 |
| 707,261 | 8/1902 | Ruttkamp | 366/74 |
| 852,114 | 4/1907 | Gowan | 366/332 |
| 3,476,364 | 11/1969 | Thomson | 366/261 |

FOREIGN PATENT DOCUMENTS 13517 8/1910 Denmark .

*Primary Examiner*—Robert W. Jenkins
*Attorney, Agent, or Firm*—Michael, Best & Friedrich

[57] ABSTRACT

An agitator carriage is supported and powered for oscillatory movement along the length of an elongated vat, i.e. from end-to-end of the vat. A pair of stirring blades are supported from the carriage, one stirring blade depending into the vat from each side of the carriage. Each stirring blade is supported to move through a generally circular path in a vertical plane, and the blades are powered independently of the carriage drive. The stirring blade movement has both a vertical and horizontal component as it moves in the vat. The speed of movement of both the carriage and the blades can be varied, independently one from the other, so that the blades, as they move longitudinally of the vat, can be made to define, in the vertical planes of movement, loops varying from generally circular to smaller loops approaching a generally undulating path.

13 Claims, 11 Drawing Figures

Fig. 7
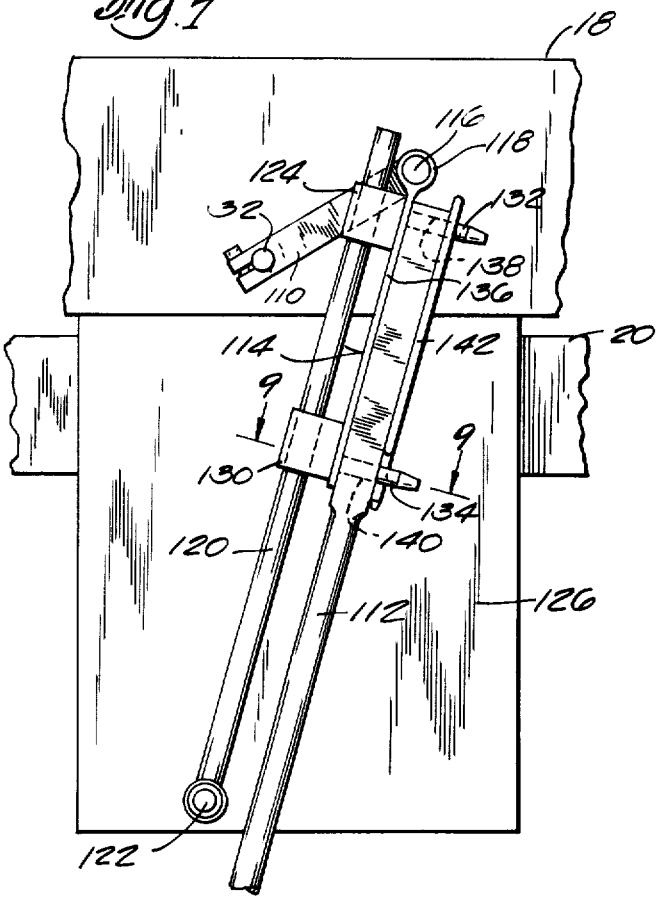
Fig. 8
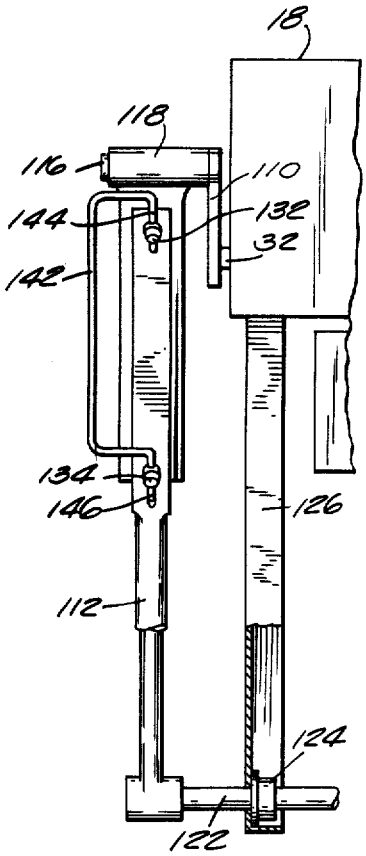
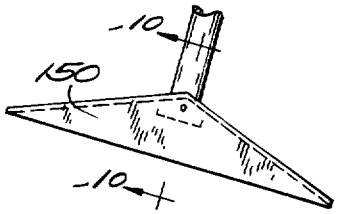
Fig. 10
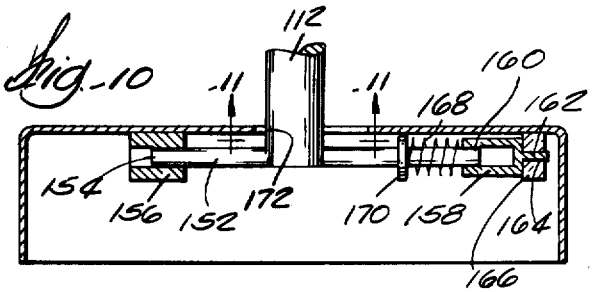
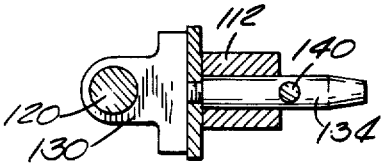
Fig. 9
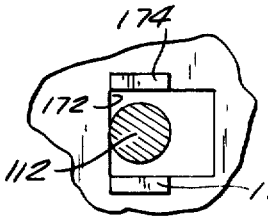
Fig. 11

WING TYPE AGITATOR

Matter enclosed in heavy brackets [ ] appears in the original patent but forms no part of this reissue specification; matter printed in italics indicates the additions made by reissue.

BACKGROUND OF THE INVENTION

This invention relates to processing equipment such as a cheese processing vat and, more particularly, to an improved arrangement for agitating the process medium contained in the vat. The invention will be discussed in connection with a cheese processing vat, specifically processing cottage cheese, but it should be understood that it can be used to process various other media.

Various steps in the process of making cottage cheese are carried out in a process vat, e.g. curd cooking, washing, creaming, etc. Stirring of the product medium is required during various steps in the process, for example the cooking step. It has been known to stir the creamed curd through the use of a traveling paddle assembly which moves through the process vat agitating the curd. Prior paddle assemblies have not been entirely satisfactory. Among the reasons for their not having been completely satisfactory is that they did not completely agitate the curd in the vat because the stirring blades had only a limited vertical extension through the curd depth. This resulted in relatively quiescent areas of curd and incomplete stirring of the curd. For the most part, such prior paddle assemblies were of the pusher type with the stirring blades being pushed through the curd. Pusher blade assemblies encounter such relatively large blade loads due to the pressure of curd thereon that the blades must be small, e.g. have a limited vertical extension, to prevent damage and/or jamming of the blade assembly against the vat wall. Stirring paddle assemblies have also been used in the past, examples of these arrangements are found in U.S. Pats. 3,476,364 and 3,490,751 both assigned to the assignee of this application.

This invention is concerned with the problem of achieving thorough stirring of the process medium in the vat, and has among its general objects to provide an arrangement which effectively achieves such stirring.

SUMMARY OF THE INVENTION

In accordance with this invention, one or more blade assemblies are supported in a process vat from a movable carriage. The carriage moves relative to the vat to propel the blade assembly, or assemblies, through the medium contained in the vat. The blades are further supported for oscillatory movement in a vertical direction, the arrangement preferably being such that the blades are driven through a generally circular path in the vertical direction. Separate drive sources are provided for the carriage and for moving the blades vertically and each drive source is independently variable. By adjusting the speeds of the carriage and the blades, the blades can be set to define a series of loops in a vertical plane, as they are moved horizontally through the vat. The size of the loops (in a horizontal direction) can be varied by adjusting the relative speeds from a condition of relatively large loops through diminishing loop sizes approaching a generally smooth undulating path. The larger loops are preferred.

Other objects and advantages will be pointed out in, or be apparent from, the specification and claims, as will obvious modifications of the embodiments shown in the drawings, in which:

FIG. 7 is a side elevation of an alternative embodiment of this invention;

FIG. 8 is an end view of the embodiment of FIG. 7;

FIG. 9 is a section view taken generally along line 9—9 of FIG. 7;

FIG. 10 is a section view taken generally along line 10—10 of FIG. 7 and illustrating an alternative blade pivot arrangement; and FIG. 11 is a section view taken generally along line 11—11 of FIG. 10.

DESCRIPTION OF THE PREFERRED EMBODIMENTS

Figure 1:
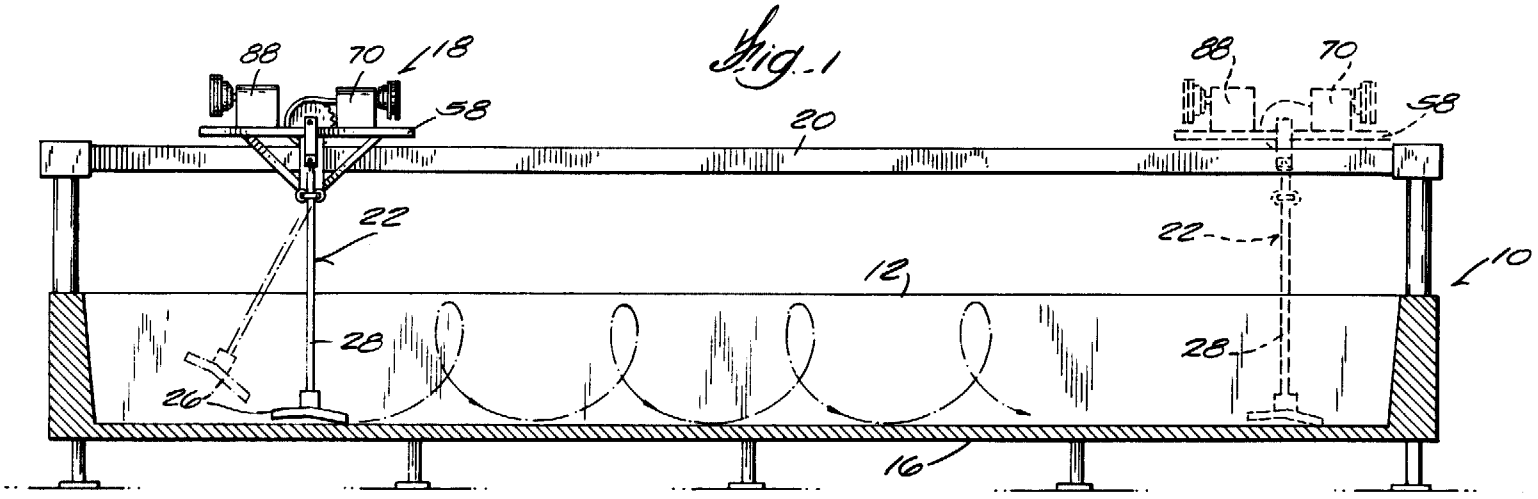
FIG. 1 is a side elevation, partially in section, of apparatus embodying this invention.
Figure 2:
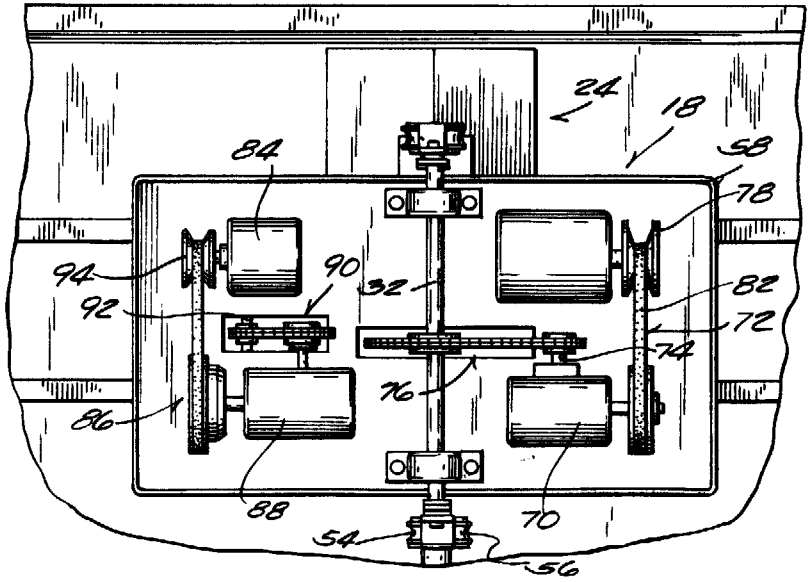
FIG. 2 is a top plan view of the carriage and agitator blade drive.

In the cottage cheese making process, process medium is pumped, or otherwise delivered, to a process vat 10 having side walls 12 and 14 and bottom wall 16. For best results, the process medium is continuously stirred during some of the process steps. To achieve this stirring, a carriage 18 is supported on and moves along rail 20. Rail 20 extends longitudinally over the vat. The carriage, by means of a suitable drive system (to be described hereinafter), is capable of traversing substantially the entire length of the vat by movement on the rail. Stirring blade assemblies 22 and 24 are suspended from carriage 18 and extend into vat 10, the paddle assemblies move longitudinally through the vat with the carriage.

Both stirring blade assemblies 22 and 24 are identical and thus only one will be described in detail. The reference numerals used in describing one, 22, will be carried over to assembly 24 but with the differentiating letter "a" so that, if desired, the description of assembly 22 can be read on assembly 24.

Figure 5:
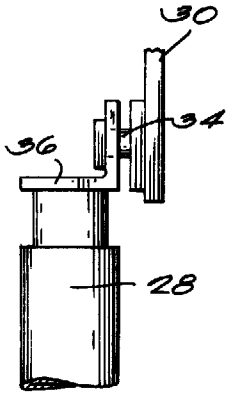
FIG. 5 is an enlarged view of the pivotal connection of a blade to a crank arm.
Figure 4:
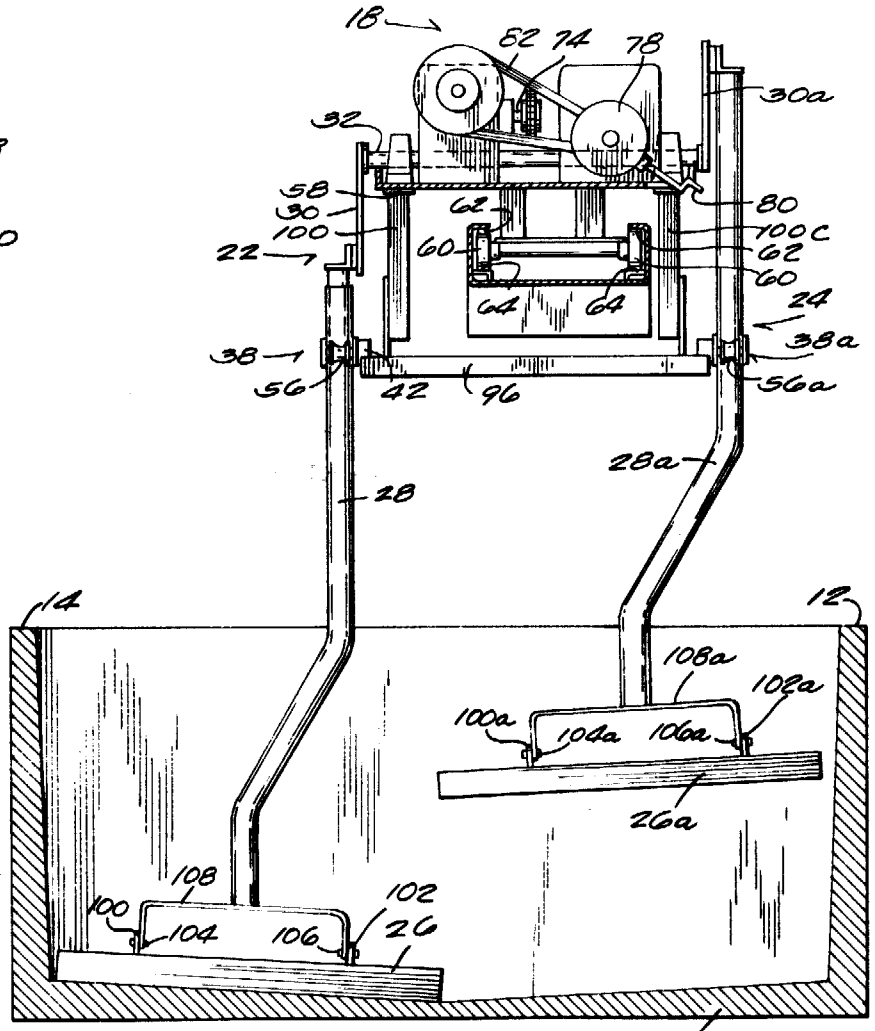
FIG. 4 is an end elevation, again enlarged as compared to FIG. 3, of the agitator blades and their drive.

Blade 26 is attached to the lower end of elongated rod 28. The upper end of rod 28 is connected to crank arm 30 which is, in turn, fixed to shaft 32 to be rotated by the shaft. A pivotal connection (see FIG. 5) is provided between the rod crank arm by pin 34 extending between the crank arm and angle bracket 36 fixed to the top of rod 28.

Figure 3:
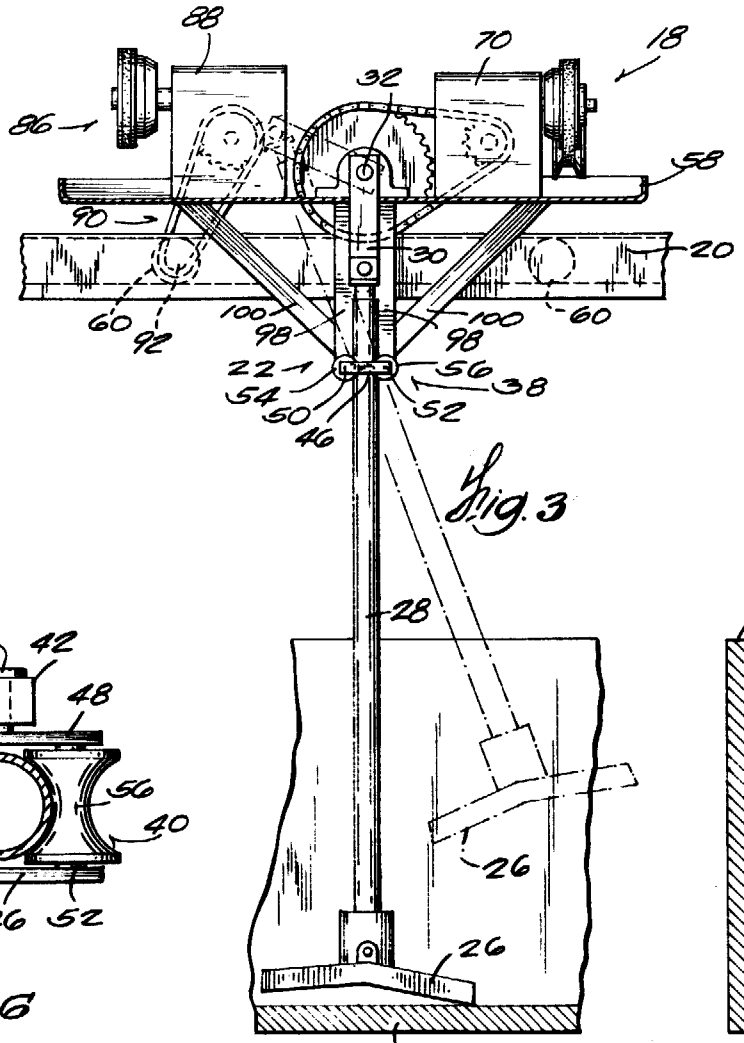
FIG. 3 is a side elevation, enlarged as compared to FIG. 1, of an agitator blade and its drive.
Figure 6:
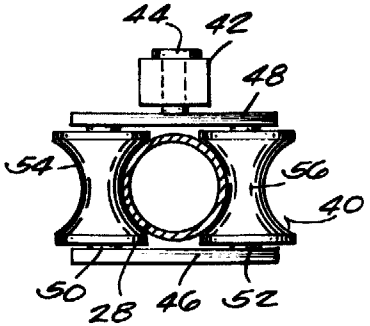
FIG. 6 is an enlarged view of pivotal support assembly for the blade.

As the crank arm rotates, the rod and correspondingly blade 26 are oscillated up and down. In operation, the blade will be oscillated in the curd and in order to direct the blade through a definite path the rod is supported intermediate its ends. More specifically, a fixed support assembly 38 includes a roller assembly 40 (see FIG. 6) having a pivotal connection to fixed block 42 by pin 44. Block 42 is fixed in the sense that it does not move horizontally or vertically relative to either the carriage or rod 28. Roller assembly 40 includes front and rear plates 46 and 48, pins 50 and 52 extending between the plates, and rollers 54 and 56 journaled on the pins. Rollers 54 and 56 engage rod 28 on diametrically opposite sides of the rod. Being engaged by support assembly 38, rod 28 will assume a series of angular positions (two of which are illustrated in FIGS. 1 and 3) causing blade 26 to move both vertically and horizontally, i.e. the blade 26 will follow a generally circular or elliptical path depending on the length of the crank arm.

The carriage includes a basic platform 58 and is supported on rail 20 by an arrangement of wheels 60 engaged between surfaces 62 and 64 provided on rail 20. The drives for both the carriage and the stirring blade assemblies are supported on platform 58.

The drive for the stirring blades includes motor 68 and gear reducer 70 connected by a V-belt drive 72. Shaft 74 extends from the gear reducer and is connected to shaft 32 by chain drive 76. Sheave 78 of the V-belt drive is a variable diameter sheave; the diameter can be changed by manipulating crank 80. By varying the diameter of sheave contact with belt 82, the input to the gear reducer can be varied and thus the output to the chain drive and shaft 32, will be varied accordingly. The operation and construction of the variable diameter sheave being conventional and well known, no further description of it on the V-belt drive will be made.

The drive for the carriage is similar to that for the stirring blade assemblies and includes motor 84, V-belt drive 86, gear reducer 88, and chain drive 90 which drives shaft 92. A pair of wheels 60 are connected on shaft 92 and the carriage is driven through that pair of wheels. Sheave 94 of the V-belt drive is a variable diameter sheave the same as sheave 78 to permit adjustment of the carriage speed, therefore its construction and operation will not be described.

Blocks 42 and 42a are supported on a horizontal channel 96, which is suspended from, but fixed to, carriage platform by vertical angle brackets 98 and angle brackets 100. It is through this frame work that support assemblies 38 and 38a are fixed relative to the carriage, and move with the carriage.

Having described the construction and arrangement of the agitator, its operation will be described. First, it will be noted that crank arms 30 and 30a are 180° out of phase and when blade assembly 28 is at bottom-dead-center blade assembly 28a is at top-dead-center. With reference to FIG. 3, crank arm 30 rotated clockwise and this movement draws the upper end of rod 28 up and to the left (as viewed in the drawing) while the lower end of the rod is drawn up and to the right, support assembly 22 pivoting about pin 44 to accommodate this swinging action of the rod. The lower end of the rod will follow a generally counterclockwise path reaching top-dead-center, when the crank is at the top of its movement, after which it will proceed down and to left (see FIG. 1) and eventually return to its bottom-dead-center position (the full line shown in FIG. 3). With the carriage stationary, the blade assemblies, with this arrangement, will follow a generally elliptical, or circular path depending on the length of the rods and/or crank arms, oscillating in a vertical plane and achieving a positive stirring action through the depth of the cottage cheese contained in the vat. The stirring blade assembly oscillates horizontally as well as vertically as a result of its generally circular path. Thus, a thorough mixing through the depth of the process medium is achieved by positively displacing that medium from the upper to the lower stratum, and vice versa, of the medium.

When the carriage drive is activated to move the blade assemblies the length of the vat, the vertical oscillating movement of the assemblies is then coupled with horizontal travel through the vat. The thorough vertical mixing is then achieved through the entire process medium contained in the vat. As illustrated in FIG. 1, this horizontal and vertical oscillatory movement of the blade assemblies causes the assemblies to describe a series of loops through the vat. Since the drives for the blade assemblies and the carriage, are independently adjustable, these relative speeds can be adjusted to define either larger or smaller loops or, if desired, to a path approaching a generally smooth undulating path. Motor 84 is reversible and, through a conventional and well known arrangement, will automatically reverse when carriage 18 reaches one end of its travel and propel the carriage back toward the other end. As depicted in FIG. 1, the carriage is traveling to the right and when it reaches the dotted line position motor 84 will automatically reverse and propel the paddle assemblies to the left. This is repeated at the left end and continues until the carriage motor is de-energized. This movement should be directly contrasted with prior art arrangements wherein the agitators moved horizontally, for example, either by stirring about a vertical axis or passing blades through the medium in a linear horizontal path.

As illustrated blades 26 and 26a are angled members in cross-section and each extends across one-half the width of the vat. This insures virtually complete process medium engagement and the angular shape alternately lifts and pushes the medium as the blade oscillates vertically. Other blade configurations can be used.

Blades 26 and 26a are supported to pivot about an axis generally normal to the direction of horizontal movement of the blade assemblies.

More specifically, blade 26 is provided with two brackets 100 and 102 extending from the upper surface thereof and engaged on pivot pins 104 and 106 which define the pivot axis for blade 26. In a conventional manner, pins 104 and 106 extend through clearance openings in the brackets and inverted U-shaped blade bracket 108 are suitably anchored to prevent withdrawal from those openings. Clearance is provided between the lower ends of inverted U-shaped bracket 108 and the upper surface of blade 26 to accommodate pivotal movement about pins 104 and 106 but with the lower ends of bracket 108 providing a stop to limit that movement. With this arrangement, blade 26 is free to pivot as the blade assembly is oscillated vertically and moved horizontally through the process medium. For example, as the blade is moving from the full line position in FIG. 3 to the dotted line position, it would actually pivot slightly clockwise and, in contrast, as the blade assembly goes past its top-dead-center position, the blade will pivot slightly in a counterclockwise direction as it moves down toward the bottom-dead-center position. This again contributes to the thorough stirring action imparted to the process medium.

Reference will now be made to the FIGS. 7–9 for the description of an alternative embodiment of this invention. In this embodiment, carriage 18 (shown in block form) is again supported for horizontal movement along track 20. Crank arm 110 is connected to and rotatable with shaft 32. In this arrangement, the pivotal connection of support arm 112 to the crank arm is made through a guide sleeve member 114, a subshaft 116 fixed to crank arm 110 being engaged in circular hub 118. The guide sleeve member is part of an overall guide mechanism which includes the sleeve member and elongated rod 120. Rod 120 is supported on pivot shaft 122 supported in a suitable bearing 124 fixed to support member 126 depending from the carriage. Guide sleeve member 114 includes two circular sleeve portions 128 and 130 which surround rod 120 and are free to slide longitudinally along the rod. The guide sleeve member is connected to support arm 112 by pins 132 and 134 extending from base 136 of the guide sleeve member through holes 138 and 140 in the upper portion of support arm 112. A keeper member 142 has spaced portions 144 and 146 which fit into apertures in pins 132 and 134 to fasten the support arm to the guide sleeve member. With this arrangement, as shaft 32 is rotated in a clockwise direction, crank arm 110 rotates in a similar direction and support arm 112 oscillates in a vertical direction, swinging generally about the fixed pivot point 122 while the carriage is moving the blade assembly horizontally.

More specifically, the assembly as illustrated in FIG. 7 shows the support arm just subsequent to its having to pass through its top-dead-center position. The crank arm is pivoting in a clockwise manner downward causing support arm 112 to also move downward with guide sleeve member sliding down on elongated rod 120 to accommodate that motion. During that rotation of the crank arm and sliding movement of guide sleeve member 114, elongated rod 120 pivots in a clockwise direction about pivot axis 122 to accommodate that motion. Accordingly, the blade assembly oscillates vertically while swinging, or pivoting, about the generally fixed axis 122 to produce the same type of motion as previously described in connection with the embodiment of FIGS. 1–6.

Again, the crank arm and the carriage are driven independently of each other so as to regulate the looped path defined by the blade assemblies through the process medium. Also, a second blade assembly and drive mechanism identical to that illustrated in FIGS. 7, 8, and 9, is provided on the opposite side of the carriage in the same manner as discussed in the embodiment of FIGS. 1–6.

Blade 150 is pivotally supported at the end of support arm 112 but in a manner different than that described in connection with the previous embodiment. With reference to FIGS. 10 and 11, the lower end of support rod 112 is T-shaped having a cross member 152. One end 154 of the cross member is journaled in a bearing block 156 fixed to the underside of blade 150. The opposite end of the cross member 152 is provided with a retractable assembly to permit connection of the support arm to the blade. More particularly, an extension 158 fits over the end 160 of the cross member and includes a projection 162 which fits into opening 164 in a second fixed block member 166. Spring 168 is seated against flange 170 and bears on the end of extension 158. The extension 158 can be moved to the left against spring 168 to free projection 162 from opening 164 and permit the support arm to be disassembled from the blade. With this arrangement, the support arm can be connected to and disconnected from the blade as desired.

Blade 150, identical to the blade in the previously discussed embodiment, is capable of pivoting about an axis which is generally normal to the direction of horizontal movement of the blade assemblies. In this arrangement, pivotal movement of the blade 150 about that axis is limited by engagement between support arm 112 and the sides of opening 172 through which the support arm extends. In order to reinforce the blade at the point of engagement, blocks 174 and 176 are connected to the underside of the blade.

Although this invention has been illustrated and described in connection with particular embodiments thereof, it will be apparent to those skilled in the art that various changes and modifications may be made therein without departing from the spirit of the invention or from the scope of the appended claims.

I claim:

1. Apparatus of the type described comprising, in combination, a vat having a bottom wall, spaced vertical side walls and an open top, a carriage, means supporting said carriage for horizontal movement relative to said vat generally parallel to said side walls, a stirring blade assembly extending through said open top into said vat, said stirring blade assembly including a blade member, means connecting said blade assembly to said carriage for horizontal movement therewith and for oscillating movement in a vertical plane relative to said carriage and said vat, said means connecting said blade assembly to said carriage including a rotatable crank arm connected to and rotatably driven by said drive means for said blade assembly, an elongated support arm connected to said blade member, means pivotally connecting said support arm to said crank arm, and guide means connected to said support arm and said carriage and movable with said carriage, said guide means supported for pivotal movement about a horizontal axis while permitting sliding movement of said support arm relative thereto so that as said support arm is raised and lowered by said crank arm said support arm can also pivot in a vertical plane generally about the pivot axis of said guide means and oscillate in a horizontal direction,

*said guide means including*

*an elongated rod,*

*means connecting said elongated rod for swinging movement about said horizontal axis,*

*and sleeve means connected to said support arm and surrounding said elongated rod for sliding movement thereon,*

*said sleeve means and said support arm oscillating vertically on said elongated rod as said crank arm is rotated with said elongated rod also swinging about said horizontal axis,* and drive means for moving said carriage horizontally relative to said vat and for oscillating said blade assembly vertically so that said carriage and said blade assembly can be moved horizontally through a process medium in said vat with said blade assembly also moving vertically.

2. The combination of claim 1 wherein said means connecting said blade assembly to said carriage is operative to impart a generally circular movement to said blade assembly as said blade assembly is oscillated in said vertical plane.

3. [The combination of claim 1 wherein said guide means comprises] *Apparatus of the type described comprising, in combination,*

*a vat having a bottom wall, spaced vertical side walls and an open top,*

*a carriage,*

*means supporting said carriage for horizontal movement relative to said vat generally parallel to said side walls,*

*a stirring blade assembly extending through said open top into said vat, said stirring blade assembly including a blade member,*

*means connecting said blade assembly to said carriage for horizontal movement therewith and for oscillating movement in a vertical plane relative to said carriage and said vat,*

*said means connecting said blade assembly to said carriage including*

*a rotatable crank arm connected to and rotatably driven by said drive means for said blade assembly,*

*an elongated support arm connected to said blade member,*

*means pivotally connecting said support arm to said crank arm,*

*and guide means connected to said support arm and said carriage and movable with said carriage, said guide means supported for pivotal movement about a horizontal axis while permitting sliding movement of said support arm relative thereto so that as said support arm is raised and lowered by said crank arm said support arm can also pivot in a vertical plane generally about the pivot axis of said guide means and oscillate in a horizontal direction,* said guide means comprising roller means engaging said support arm intermediate said blade member and the connection of said support arm to said crank arm, said guide means supporting said support arm for sliding movement of said support arm relative to said guide means and, during said sliding movement, said roller means maintaining continuous engagement with said support arm and pivoting about said axis,

*and drive means moving said carriage horizontally relative to said vat and for oscillating said blade assembly vertically so that said carriage and said blade assembly can be moved horizontally through a process medium in said vat with said blade assembly also moving vertically.*

4. The combination of claim 3 wherein said carriage and blade assemblies have separate drive sources and each drive source is independently variable.

[5. The combination of claim 1 wherein said guide means comprises an elongated rod, means connecting said elongated rod for swinging movement about said horizontal axis, and sleeve means connected to said support arm and surrounding said elongated rod for sliding movement thereon, said sleeve means and said support arm oscillating vertically on said elongated rod as said crank arm is rotated with said elongated rod also swinging about said horizontal axis.]

6. The combination of claim [5] *1* wherein said carriage and blade assemblies have separate drive sources and each drive source is independently variable.

7. Apparatus of the type described comprising, in combination, an elongated vat having a bottom wall, spaced vertical side walls, closed ends, and an open top, means defining an elongated track above and extending generally parallel to the longitudinal axis of said vat, a carriage engaged on said track, first drive means for moving said carriage along said track, a blade assembly connected to said carriage for movement therewith and extending from said carriage through the open top of and into said vat, second drive means supported on said carriage for movement therewith and including a crank arm rotatable in a vertical plane, said blade assembly including an elongated support arm pivotally connected to and rotatable with said crank arm and a blade member connected to the portion of said support arm in said vat, and guide means connected to said carriage for movement therewith and having a generally fixed position relative to said carriage while being generally pivotable about a horizontal axis and engaging said support arm, said support arm connected for sliding movement relative to said guide means while pivoting about said horizontal axis as said support arm is driven by said crank arm,

*said guide means comprising,*

*an elongated rod,*

*means connecting said elongated rod for swinging movement about said horizontal axis,*

*and sleeve means connected to said support arm and surrounding said elongated rod for sliding movement thereon,*

*said sleeve means and said support arm oscillating vertically on said elongated rod as said crank arm is rotated and said elongated rod also swinging about said horizontal axis,* whereby said blade member is propelled through a process medium in said vat and oscillates vertically as well as horizontally.

8. The combination of claim 7 wherein said first and second drive means are independently adjustable to vary the speed of said carriage independent of that of the oscillating movement of said blade member.

9. [The combination of claim 8 wherein] *Apparatus of the type described comprising, in combination,*

*an elongated vat having a bottom wall, spaced vertical side walls, closed ends, and an open top,*

*means defining an elongated track above and extending generally parallel to the longitudinal axis of said vat,*

*a carriage engaged on said track,*

*first drive means for moving said carriage along said track,*

*a blade assembly connected to said carriage for movement therewith and extending from said carriage through the open top of and into said vat,*

*second drive means supported on said carriage for movement therewith and including a crank arm rotatable in a vertical plane,*

*said blade assembly including an elongated support arm pivotally connected to and rotatable with said crank arm and a blade member connected to the portion of said support arm in said vat,*

*and guide means connected to said carriage for movement therewith and having a generally fixed position relative to said carriage while being generally pivotable about a horizontal axis and engaging said support arm, said support arm connected for sliding movement relative to said guide means while pivoting*

*about said horizontal axis as said support arm is driven by said crank arm,* said guide means includes roller means engaging said support arm intermediate said blade member and the connection of said support arm to said crank arm, said guide arms supporting said support arm for sliding movement of said support arm relative to said guide means and, during said sliding movement, said roller means maintaining continuous engagement with said support arm and pivoting about said axis,

*whereby said blade member is propelled through a process medium in said vat and oscillates vertically as well as horizontally.*

[10. The combination of claim 8 wherein said guide means comprises an elongated rod, means connecting said elongated rod for swinging movement about said horizontal axis, and sleeve means connected to said support arm and surrounding said elongated rod for sliding movement thereon, said sleeve means and said support arm oscillating vertically on said elongated rod as said crank arm is rotated and said elongated rod also swinging about said horizontal axis.]

11. The combination of claim 7 wherein said blade assembly depends from one side of said carriage and including a second blade assembly connected to said carriage for movement therewith and extending from said carriage through the open top of and into said vat from the opposite side of said carriage, a second crank arm connected to said second drive means and rotatable in a vertical plane, said second blade assembly including a second elongated support arm pivotally connected to and rotatable with said second crank arm and a blade member connected to the portion of said second support arm in said vat, and second guide means connected to said carriage for movement therewith, said first and second guide means having a fixed position relative to said carriage, said guide means being pivotal about a horizontal axis and each engaging said first and second support arms intermediate the ends thereof with said support arms sliding relative to said guide means while pivoting about said horizontal axis as said support arms are driven by said crank arms, whereby said blade members are propelled through a process medium in said vat and move vertically as well as horizontally.

12. The combination of claim 7 wherein said blade assembly depends from one side of said carriage and including a second blade assembly connected to said carriage for movement therewith and extending from said carriage through the open top of and into said vat from the opposite side of said carriage, a second crank arm connected to said second drive means and rotatable in a vertical plane, said second blade assembly including a second elongated support arm pivotally connected to and rotatable with said second crank arm and a blade member connected to the portion of said second support arm in said vat, and second guide means connected to said carriage for movement therewith, said first and second guide means each comprise an elongated rod, means connecting said elongated rod for swinging movement about said horizontal axis, and sleeve means connected to said support arm and surrounding said elongated rod for sliding movement thereon, said sleeve means and said support arm oscillating vertically on said elongated rod as said crank arm is rotated and said elongated rod also swinging about said horizontal axis, whereby said blade members are propelled through a process medium in said vat and move vertically as well as horizontally.

13. The combination of claim 12 wherein said first and second drive means are independently adjustable to vary the speed of said carriage independent of that of the vertical oscillating movement of said first and second blade members.

14. The combination of claim 12 wherein said blade assemblies each include a blade having a horizontal and a vertical extension, and means supporting said blade for pivotal movement about a horizontal axis generally normal to the direction of horizontal movement of said blade assembly.

15. The combination of claim 7 wherein said blade assembly includes a blade having a horizontal and a vertical extension, and means supporting said blade for pivotal movement about a horizontal axis generally normal to the direction of horizontal movement of said blade assembly.

* * * * *